United States Patent
Katic et al.

(10) Patent No.: US 8,644,369 B1
(45) Date of Patent: Feb. 4, 2014

(54) EQUALIZER ADAPTATION FOR HEAVILY COMPRESSED OR CLIPPED COMMUNICATIONS SIGNALS

(75) Inventors: Ognjen Katic, Vancouver (CA); Paul V. Yee, Vancouver (CA); William D. Warner, Maple Ridge (CA)

(73) Assignee: PMC-Sierra, Inc., Sunnyvale, CA (US)

( * ) Notice: Subject to any disclaimer, the term of this patent is extended or adjusted under 35 U.S.C. 154(b) by 532 days.

(21) Appl. No.: 12/628,894

(22) Filed: Dec. 1, 2009

(51) Int. Cl.
*H03H 7/30* (2006.01)

(52) U.S. Cl.
USPC ....................................... 375/232

(58) Field of Classification Search
USPC ........... 375/232, 233, 344, 346; 708/322, 323
See application file for complete search history.

(56) References Cited

U.S. PATENT DOCUMENTS

| | | |
|---|---|---|
| 3,792,356 A | 2/1974 | Kobayashi et al. |
| 4,170,758 A | 10/1979 | Tamburelli |
| 4,283,788 A | 8/1981 | Tamburelli |
| 4,789,994 A | 12/1988 | Randall et al. |
| 5,020,078 A | 5/1991 | Crespo |
| 5,058,130 A | 10/1991 | Park |
| 5,396,519 A | 3/1995 | Betts |
| 5,434,884 A | 7/1995 | Rushing et al. |
| 5,524,124 A | 6/1996 | Koenig |
| 5,539,774 A | 7/1996 | Nobakht et al. |
| 5,581,585 A | 12/1996 | Takatori et al. |
| 5,594,756 A | 1/1997 | Sakurai et al. |
| 5,608,757 A | 3/1997 | Smith et al. |
| 5,617,450 A | 4/1997 | Kakuishi et al. |
| 5,675,612 A | 10/1997 | Solve et al. |
| 5,748,674 A | 5/1998 | Lim |
| 5,903,605 A | 5/1999 | Crittenden |
| 5,991,339 A | 11/1999 | Bazes et al. |
| 6,055,269 A | 4/2000 | Drost et al. |
| 6,167,082 A | 12/2000 | Ling et al. |
| 6,192,072 B1 | 2/2001 | Azadet et al. |
| 6,307,884 B1 | 10/2001 | Du et al. |
| 6,337,878 B1 | 1/2002 | Endres et al. |
| 6,363,112 B1 | 3/2002 | Azadet et al. |
| 6,384,858 B1* | 5/2002 | Limberg .................. 348/21 |

(Continued)

FOREIGN PATENT DOCUMENTS

GB     2355639     4/2001

OTHER PUBLICATIONS

Bittner, et al.; Iterative Correction of Clipped and Filtered Spatially Multiplexed OFDM Signals; Proceedings of the 67th IEEE Vehicular Technology Conference (VTC'08); May 2008; pp. 953-957, Singapore.

(Continued)

*Primary Examiner* — Young T. Tse
(74) *Attorney, Agent, or Firm* — Knobbe Martens Olson & Bear LLP

(57) ABSTRACT

Apparatus and methods generate equalizer coefficients for an equalizer of a receiver. In a high-speed receiver, received symbols can be subject to inter-symbol-interference (ISI). An equalizer can compensate for ISI and improve a bit error rate (BER). However, traditional adaptive techniques to generate coefficients for equalization can generate corrupted coefficients when equalized samples used for adaptation are based on clipped or heavily compressed signals. In certain situations, the clipping rate can be relatively high, such as over 20%. Equalizer performance is improved when the equalized symbols used directly or indirectly for adaptation are selected such that equalized symbols based on clipped input samples are not used for adaptation.

20 Claims, 12 Drawing Sheets

(56) References Cited

U.S. PATENT DOCUMENTS

| | | |
|---|---|---|
| 6,414,990 B1 | 7/2002 | Jonsson et al. |
| 6,418,164 B1 | 7/2002 | Endres et al. |
| 6,426,972 B1 | 7/2002 | Endres et al. |
| 6,452,975 B1 | 9/2002 | Hannah |
| 6,501,792 B2 | 12/2002 | Webster |
| 6,606,047 B1 | 8/2003 | Borjesson et al. |
| 6,668,014 B1 | 12/2003 | Endres et al. |
| 6,697,423 B1 | 2/2004 | Jin et al. |
| 6,850,563 B1 | 2/2005 | Hulyalkar et al. |
| 7,136,440 B2 | 11/2006 | Brianti et al. |
| 7,154,946 B1 | 12/2006 | Katic |
| 7,177,352 B1 | 2/2007 | Plasterer et al. |
| 7,242,712 B1 | 7/2007 | Katic |
| 7,254,198 B1 | 8/2007 | Manickam et al. |
| 7,266,145 B2 | 9/2007 | Balasubramonian et al. |
| 7,336,729 B2 | 2/2008 | Agazzi |
| 7,339,989 B1 | 3/2008 | McAdam et al. |
| 7,340,006 B2 | 3/2008 | Yun et al. |
| 7,346,119 B2 | 3/2008 | Gorecki |
| 7,469,003 B2 | 12/2008 | Papasakellariou |
| 7,912,151 B1 | 3/2011 | McAdam |
| 8,428,113 B1 | 4/2013 | Katic |
| 2002/0186916 A1 | 12/2002 | Bessios |
| 2003/0063680 A1 | 4/2003 | Nedic et al. |
| 2004/0001540 A1 | 1/2004 | Jones |
| 2004/0234002 A1 | 11/2004 | Yang et al. |
| 2005/0243955 A1* | 11/2005 | Mondragon-Torres et al. ............ 375/347 |
| 2008/0049825 A1 | 2/2008 | Chen et al. |

OTHER PUBLICATIONS

Katic, et al; Equalizer For Heavily Clipped or Compressed Communications Signals; Specification and Drawings of related U.S. Appl. No. 12/359,046, filed Jan. 23, 2009.

M.E. Austin; Decision Feedback Equalization for Digital Communication over Dispersive Channels; M.I.T./R.L.E. Tech. Rep. 461; Aug. 11, 1967.

George, et al.; An Adaptive Decision Feedback Equalizer; IEEE Transactions on Communication Technology, vol. Com-19, No. 3, Jun. 1971.

G. Ungerboeck; Fractional Tap-Spacing Equalizer and Consequences for Clock Recovery in Data Modems; IEEE Transactions on Communication s; vol. 24, Issue 8; pp. 856-864; Aug. 1976.

Woo, et al; Advance Dual Decision Feedback Equalizer for Perpendicular Magnetic Recording Channel, Magnetic Conference; 2002; INTERMAG Europe 2002; IEEE; pp. GP4.

J. Brown, P. Hurst, Bret Rothenberg, and S. Lewis, "A CMOS Adaptive Continuous-Time Forward Equalizer, LPF, and RAM-DFE for Magnetic Recording," IEEE Journal of Solid-State Circuits, vol. 34, No. 2, Feb. 1999, pp. 162-169.

Y. Kim and H. Lee, "A Decision-Feedback Equalizer with Pattern-Dependent Feedback for Magnetic Recording Channels," IEEE Transactions on Communications, vol. 49, No. 1, Jan. 2001, pp. 9-13.

J. P. Leblanc and S. W. McLaughlin, "Enhanced RAM-Based Equalizers for Nonlinear Channels," Conference Record of the Thirty-Second Asilomar Conference on Signals, Systems and Computers (Nov. 1-4, 1997, Pacific Grove, California).

J. Bergmans, J. O. Voorman, and H. W. Wong-Lam, "Dual Decision Feedback Equalizer," IEEE Transactions on Communications, vol. 45, No. 5, May 1997, pp. 514-518.

Ming Jin, K. C. Indukumar, B. Farhang-Boroujeny, and G. Mathew, "Dual FDTS/DF: A Unified Approach to Dual-Detection and Modification for MTR Codes," IEEE Transactions on Magnetics, vol. 37 No. 3, May 2001, pp. 1175-1186.

M. Chiani, "Introducing Erasures in Decision-Feedback Equalization to Reduce Error Propagation," IEEE Transactions on Communications, vol. 45, No. 7, Jul. 1997, pp. 757-760.

H. Yoo, S. Ong, C. Kang, and D. Hong, "Prediction Based Direct Blind Decision Feedback Equalization," 2002 IEEE International Conference on Acoustics, Speech and Signal Procession (27th), vol. 3, pp. 2481-2484.

D. Raphaeli and A. Stark, "Partial Imaginary Precursor Cancelling in DFE for BPSK and GMSK Modulations," European Transactions on Telecommunications, vol. 12-6, pp. 461-469, 2001.

Qureshi, Shahid U. H.; Adaptive Equalization; Proceedings of the IEEE; vol. 73, No. 9; Sep. 1985; Institute of Electrical and Electronics Engineers, Inc.; pp. 1349-1381.

USPTO; Office Action dated Apr. 26, 2012, from related U.S. Appl. No. 12/359,046, filed Jan. 23, 2009.

* cited by examiner

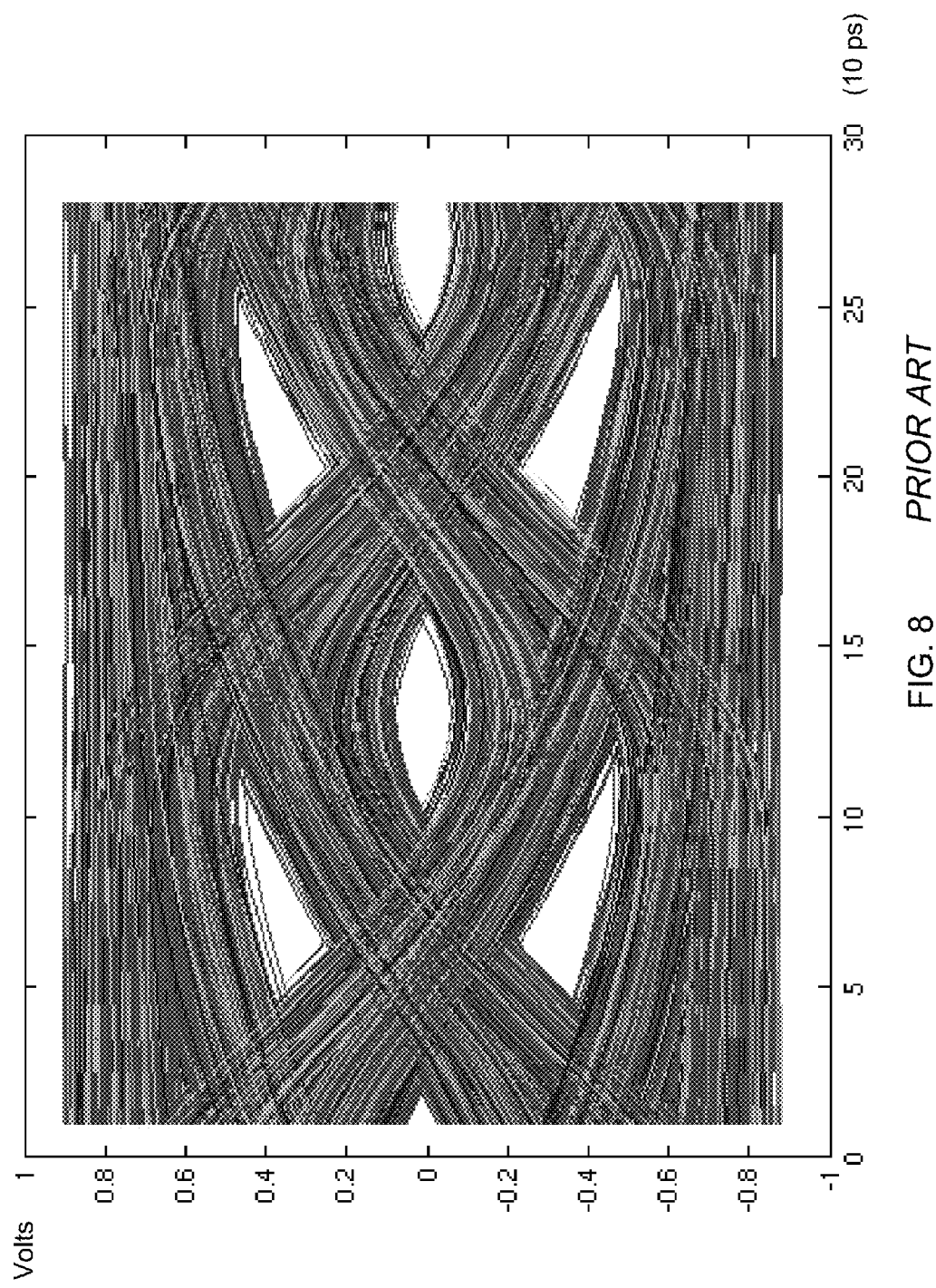
FIG. 8  *PRIOR ART*

EQUALIZER ADAPTATION FOR HEAVILY COMPRESSED OR CLIPPED COMMUNICATIONS SIGNALS

CROSS-REFERENCE TO RELATED APPLICATION

This application is related to copending application titled EQUALIZER FOR HEAVILY CLIPPED OR COMPRESSED COMMUNICATIONS SIGNALS, Ser. No. 12/359,046, filed on Jan. 23, 2009, the disclosure of which is hereby incorporated by reference in its entirety herein.

BACKGROUND

1. Field of the Invention

Embodiments of the invention generally relate to electronics, and in particular, to adaptive equalization of communications signals.

2. Description of the Related Art

Physical impairments can limit the effective transmission of data signals over communications channels. For example, channels can be frequency selective and can attenuate and phase shift the various frequency components of an input signal in a non-uniform manner, resulting in channel distortion. The corresponding impulse response of the channel can span several symbol intervals, which results in time-smearing and intersymbol interference (ISI). The ISI resulting from channel distortion, if left uncompensated, can cause high error rates.

One approach to handling ISI is to compensate for or reduce the ISI in the received signal with an equalizer. Various equalization techniques exist. For channels with relatively mild ISI impairments, a linear equalizer (LE) can be used. The linear equalizer is a sub-optimal equalizer structure implemented with a relatively simple finite impulse response (FIR) filter. It is popular because it has relatively low computational complexity compared to other equalizers, such as an equalizer based on optimal maximum likelihood sequence estimation (MLSE). The filter coefficients of a linear equalizer can be fixed and based on a known channel impulse response, or can be adaptively adjusted in response to channel characteristics, which can vary and can change over time. These linear equalizers are typically implemented digitally.

Many adaptive algorithms exist for finding relatively good or optimal equalizer tap coefficients depending on criteria, a-priori knowledge of channel characteristics, and the like. Adaptive algorithms include statistical methods for feature and model adaptation, which can be complex to implement. However, when the communication environment can be approximated with a Gaussian channel, the optimal equalizer taps can be determined by a relatively simple minimum mean-squared-error (MMSE) criterion. A linear MMSE receiver should minimize the error variance encountered at the slicer and consequently bit-error-rate (BER).

Minimum mean-squared-error (MMSE) is usually implemented with least-mean-square (LMS) algorithm, which is computationally efficient. Different variants of LMS such as block-LMS, leaky-LMS, sign (or clipped) LMS algorithms, normalized LMS, and the like, can alternatively be used. In this disclosure, reference to LMS adaptation includes all these variants.

Clipping is an example of a non-linear distortion that can severely impact linear equalizer performance. For example, an LMS algorithm is typically sensitive to a harsh non-linear distortion of the received signal. Unless clipping occurs rarely, such as less than 1% of the time, clipping will significantly reduce the performance of an LMS algorithm. Conventional techniques exist to avoid or ameliorate the effects of clipping.

For example, interpolation can be used. See, for example, U.S. Pat. No. 6,606,047 to Borjesson, et al. When dealing with the problem of equalizing clipped signals in OFDM systems that achieve reduced peak-to-average ratio by clipping and filtering the transmit signal, the effect of clipping noise at the receiver can be recreated to remove it from the incoming signal as presented in Bittner, S. et al. in *Iterative Correction of Clipped and Filtered Spatially Multiplexed OFDM Signals*, Proceedings of the 67th IEEE Vehicular Technology Conference, Spring 2008, pp. 953-957, May 2008.

Other systems attempt to avoid equalizer operation in a non-linear region. See U.S. Pat. No. 7,336,729 to Agazzi and U.S. Pat. No. 7,346,119 to Gorecki, et al.

These equalizers are commonly used in serializer-deserializer (SERDES) applications. One application of SERDES is to transfer data over a backplane channel at a relatively high data rate. FIG. 1 illustrates an example of a channel impulse response (CIR) of a typical backplane used for 6 Gbit/s operation.

Under the conditions of no correlations among the transmitted data, a Gaussian noise environment, and no non-linear distortions, the distortion from a channel having characteristics illustrated in FIG. 1 should be readily equalized with a linear minimum mean-squared-error (MMSE) equalizer using LMS adaptation. The ISI distortion of such a channel is not expected to be severe, and a relatively simple 2-tap adaptive equalizer as illustrated in FIG. 2 can be used.

The 2-tap adaptive equalizer illustrated in FIG. 2 is termed a post-cursor equalizer because the equalizer mostly affects the dominant post-cursors of the impulse response. The illustrated 2-tap adaptive equalizer includes a multiplier 202 for a first tap coefficient $c_0(k)$, a multiplier 204 for a second tap coefficient $c_1(k)$, a delay element 206, a summing circuit 208, a slicer 210, a differencing circuit 212, and an adaptation engine 214. In a high-speed SERDES, the taps of the equalizer are usually normalized so that the coefficient $c_0(k)$ for the first tap is equal to 1. In that instance, the 2-tap post-cursor equalizer illustrated in FIG. 2 is usually referred to as a single tap equalizer.

Assuming a Gaussian channel and an uncorrelated input sequence, the adaptation of the equalizer of FIG. 2 can be achieved using a least mean squares (LMS) algorithm. Applicable LMS adaptation equations are expressed in Equations 1(a) and 1(b).

$$c_0(k+1) = c_0(k) + \mu \cdot e(k) \cdot x(k) \qquad \text{(Eq. 1A)}$$

$$c_1(k+1) = c_1(k) + \mu \cdot e(k) \cdot x(k-1) \qquad \text{(Eq. 1B)}$$

In Equations 1A and 1B, the symbol $\mu$ represents the adaptation step, and k is the time index. The LMS adaptation of equalizer taps $[c_0, c_1]$ is driven by the input samples $[x(k), x(k-1)]$ and the error signal $e(k)$. The input samples $x(k)$ are soft, such as, quantized to 3 bits or more by an analog-to-digital converter, but can be clipped or compressed as will be explained later. Soft information carried by those signals and a low bit error rate (BER) at the slicer output (hard) permit proper convergence of the algorithm.

For the adaptive equalizer illustrated in FIG. 2, the error signal $e(k)$ and soft equalizer output signal $y(k)$ can be as expressed by Equations 2A and 2B.

$$e(k) = d(k) - y(k) \qquad \text{(Eq. 2A)}$$

$$y(k) = c_0(k) \cdot x(k) + c_1(k) \cdot x(k-1) \qquad \text{(Eq. 2B)}$$

Under ideal and near ideal conditions, an adaptive LMS algorithm will typically converge to a solution for the linear equalizer with optimal MMSE tap values (filter coefficients). For example, with the example channel illustrated in FIG. 1, the optimal equalizer tap coefficient values are [2.12, −0.80], or alternatively in the normalized single-tap form are [1, −0.38].

However, when the received signal x(k) is severely distorted by harsh compression or clipping, the soft information relied upon for correct convergence will typically not be available. Under clipped conditions, the normally "soft" received signal x(k) can be modeled by x_clip(k), which can have a "hard" characteristic, as illustrated in Equation 3.

$$k \times_{clip}(k) = \text{sign}[x(k)] \cdot nl\_level \quad \text{(Eq 3)}$$

The variable nl_level of Equation 3 depends on the communications channel input/output transfer. When the non-linearity is described by a limiter, the variable nl_level is equal to the clip level. Depending on the analog-to-digital converter (ADC) clipping level and the channel characteristics, various clipping rates, that is, the rate at which samples are clipped, can be encountered. In addition, a 2-tap equalizer can have 4 possible combinations of clipped/not-clipped symbol samples for [x(k) x(k−1)] that drive the adaptation algorithm. These combinations are: both samples clipped, both samples not clipped, and only one or the other sample clipped.

When the equalizer adaptation is driven by clipped samples, the resulting tap values generated by adaptation can vary significantly from the values for an optimal MMSE receiver. For example, with the example channel of FIG. 1 and with the clipping level set so that the clipping rate is 0.5 or 50%, the LMS algorithm can deviate from an optimal linear MMSE solution and converge to equalizer tap coefficient values of [2.50, −0.63], or for the normalized single tap form, [1, −0.25]. In this example, the loss of soft information results in a considerable under-equalization of the samples and worse performance for ISI.

SUMMARY

In a high-speed receiver such as a serializer-deserializer (SERDES), received symbols can be subject to inter-symbol-interference (ISI). An equalizer can compensate for ISI and improve a bit error rate (BER). However, traditional adaptive techniques to generate coefficients for equalization can generate corrupted coefficients when equalized samples used for adaptation are based on clipped or heavily compressed signals. In certain situations, the clipping rate can be relatively high, such as over 20%. Equalizer performance is improved when the equalized symbols used directly or indirectly for adaptation are selected such that equalized symbols based on clipped input samples are not used for adaptation.

While disclosed techniques can be used with high-speed SERDES devices, the techniques are not limited to SERDES. Disclosed techniques can be used in any communications or other system that encounters signal clipping and uses adaptive filtering. Advantageously, disclosed techniques can be implemented by relatively low-cost digital signal processing (DSP) techniques, which can be implemented in integrated circuits.

BRIEF DESCRIPTION OF THE DRAWINGS

These drawings and the associated description herein are provided to illustrate specific embodiments of the invention and are not intended to be limiting.

FIGS. 8-11 are simulations of data eye diagrams for various conditions.

DETAILED DESCRIPTION OF SPECIFIC EMBODIMENTS

Although particular embodiments are described herein, other embodiments of the invention, including embodiments that do not provide all of the benefits and features set forth herein, will be apparent to those of ordinary skill in the art. In addition, while illustrated in the context of a post-cursor equalizer with 2 taps and heavily clipped signals, the principles and advantages described herein are applicable to more complex equalizers and also to other types of non-linearities.

When a received signal x(k) is heavily clipped at relatively high clipping rates, such as 20% or more, much of the soft information that is normally relied upon for equalizer application and adaptation becomes corrupted. Embodiments of the invention advantageously identify whether input samples have been clipped, and if so, then equalizer adaptation is not based on those samples. Even when equalizer adaptation is not based on clipped samples, the coefficient(s) generated are sensitive to the clipping rate because of the correlations introduced in selecting samples for adaptation.

Figure 1:
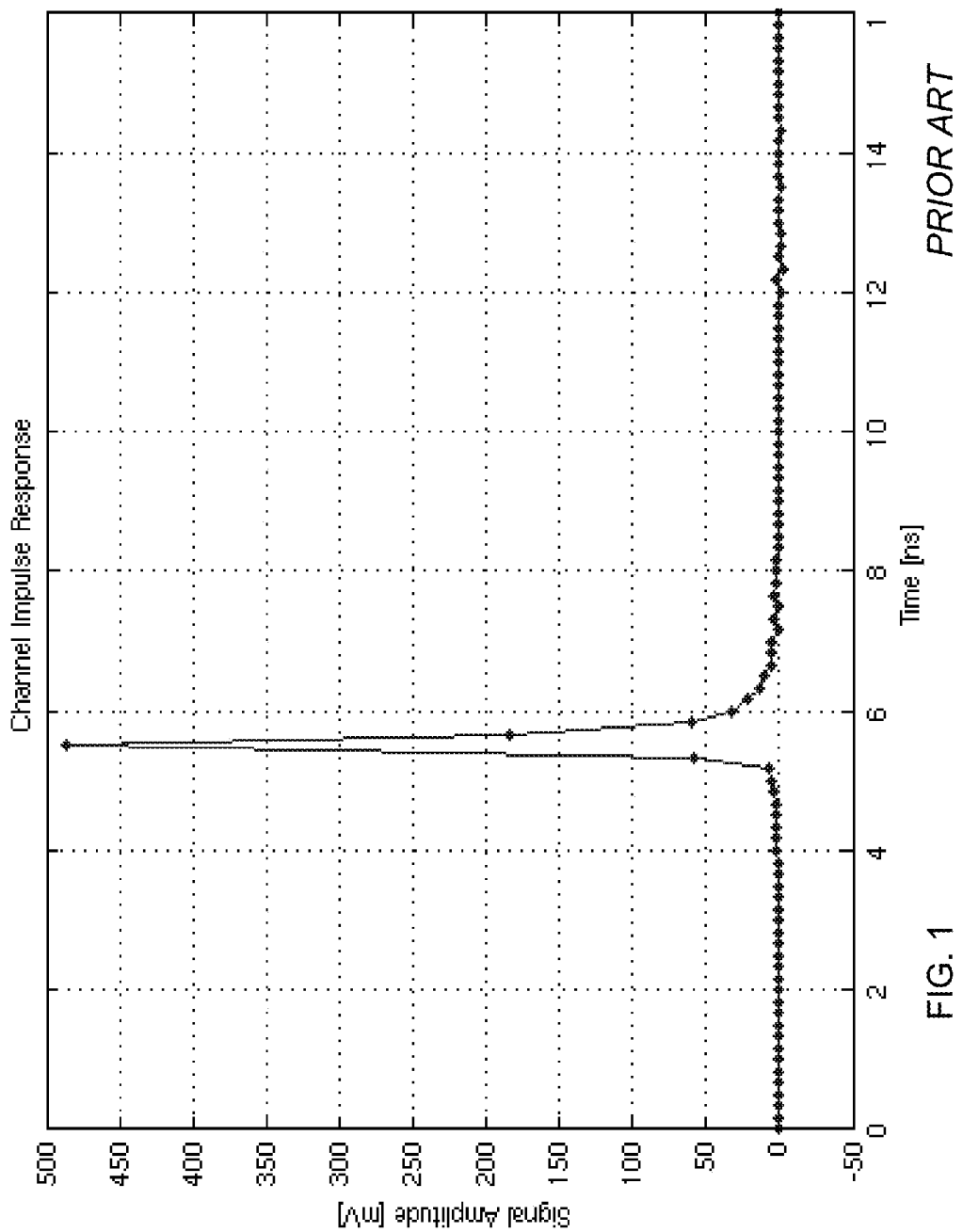
FIG. 1 illustrates an example of a channel impulse response for a typical backplane channel.
Figure 2:
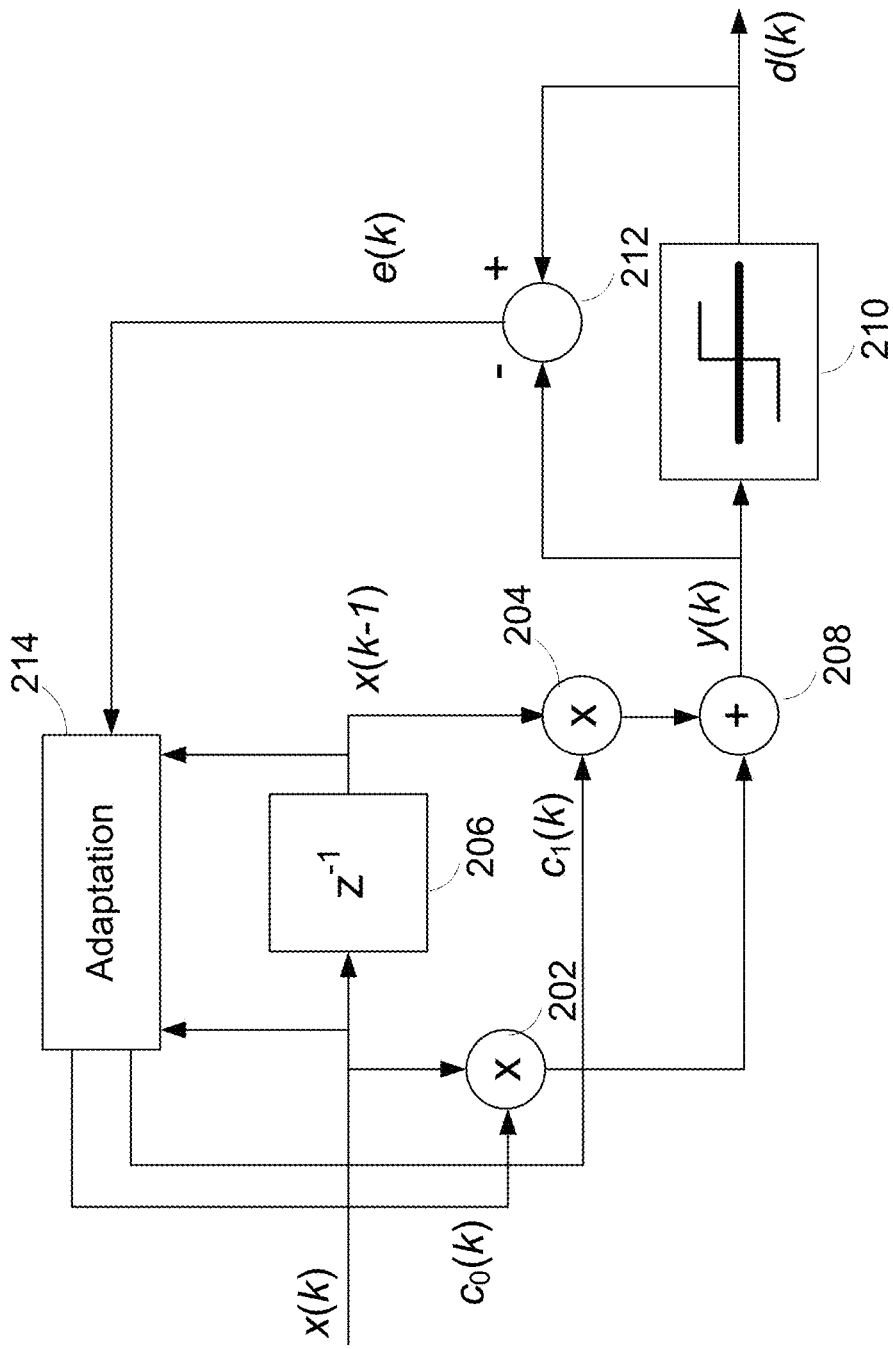
FIG. 2 illustrates a conventional 2-tap adaptive equalizer.
Figure 3:
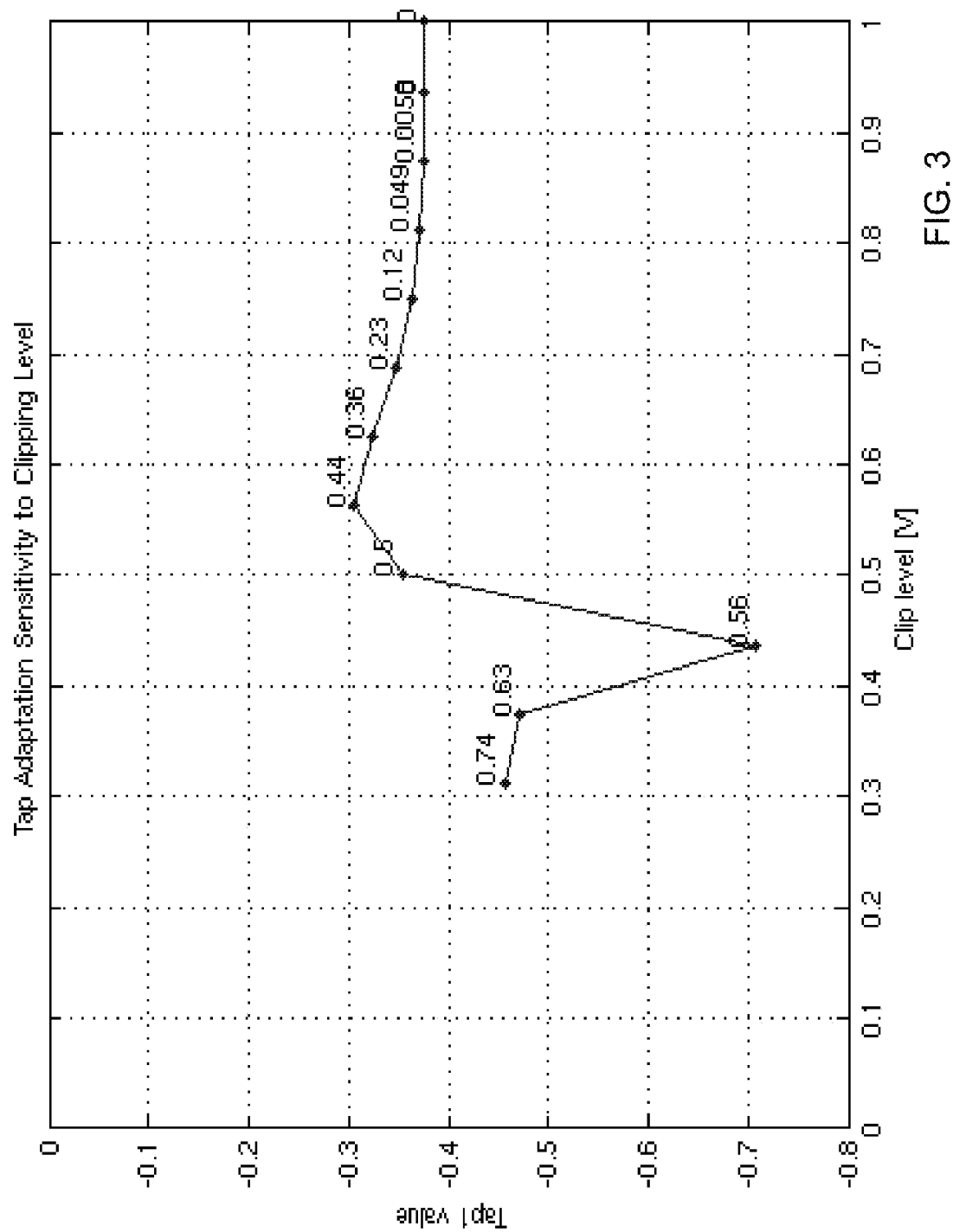
FIG. 3 is a graph illustrating tap adaptation sensitivity to clipping level.

FIG. 3 illustrates tap adaptation sensitivity for a normalized example equalizer when used with response of the backplane channel of FIG. 1. The clip level, that is, the level at which clipping occurs, is expressed along a horizontal axis. The data points for tap adaptation sensitivity are taken from 0.3125 volts to 1 volt in 62.5 millivolt (mV) steps. The coefficient $c_0(k)$ for the normalized tap remains at its normalized value of 1. A vertical axis illustrates a scale for the normalized tap value or coefficient $c_1(k)$ for the delayed tap (FIG. 2) determined after adaptation with the various clipped levels expressed along the horizontal axis. The number adjacent to each data point indicates the corresponding clipping rate or fraction at which clipping occurs.

As indicated in FIG. 3, when the clipping rates are above about 0.5 (50%), an adaptation algorithm can calculate incorrect coefficient(s) for the equalizer even when selecting equalized samples y, output sample d, for generation of error signal s based on non-clipped input samples x are relied upon for adaptation. As discussed earlier in connection with FIG. 2, in the ideal case, the coefficient $c_1(k)$ for the delayed tap is −0.38. Between 500 mV and 1 V, which corresponds to clipping rates of 0.5 (50%) down to 0, which is the no-clipping case, the adaptation algorithm calculates a coefficient value that is close to the ideal case. However, for clipping rates above 0.5 (50%), such as at the data points corresponding to clipping rates of 0.56 (56%), 0.63 (63%), and 0.74 (74%), the adaptation algorithm generates incorrect values for coefficient $c_1(k)$ of the equalizer.

In the illustrated example, the clipping rate would be 1 or 100% when the clipping level is set to 250 mV or below. At 100% clipping, it is impractical to compute coefficient values for equalizer taps because the soft information relied upon for adaptation will not be present. Note also that for clipping rates between about 0.2 and about 0.45, the adapted value for the coefficient $c_1(k)$ will typically be under equalized relative to the value calculated when there is no clipping. This knowledge can be used for modifying a calculated equalizer tap coefficient to improve system performance. While illustrated with one particular channel, adaptation for other channels that have dominant post-cursor behavior can be expected to be corrupted by clipping in a similar manner.

In one embodiment, equalizer adaptation is performed based only on samples determined not to be clipped. A subset of input symbols is selected and used for adaptive adjustment of filter tap coefficients. The selection of input symbols is equivalent to introducing correlations into the input bit sequence, which results in equalizer tap sensitivity to the clipping level (or clipping rate).

In another embodiment, the selective equalizer adaptation techniques described above are combined with selective equalization techniques described in copending and commonly-owned U.S. patent application Ser. No. 12/359,046. For example, in the context of a normalized single-tap equalizer, the equalization is decreased or eliminated when clipping and/or harsh compression is detected for the current samples $x(k)$ or previous samples $x(k-1)$. For example, one embodiment of U.S. patent application Ser. No. 12/359,046 provides: (1) no equalization when the current samples $x(k)$ are clipped; (2) normal linear equalization, when neither the current $x(k)$ nor previous samples $x(k-1)$ is clipped; and (3) equalization with a weighted previously clipped sample (which is equivalent to tap weighting) when the current sample $x(k)$ is not clipped.

Figure 4:
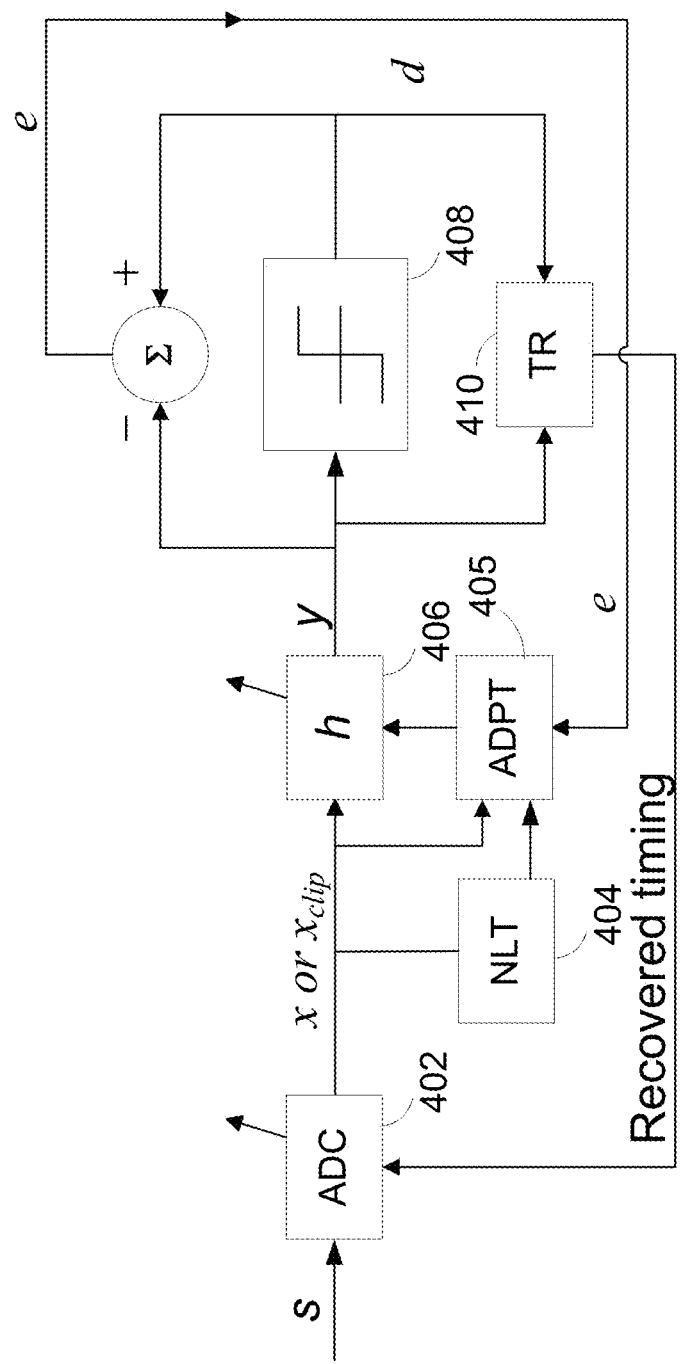
FIG. 4 is a schematic of a receiver embodying an equalizer according to an embodiment of the invention.

FIG. 4 is a schematic of a receiver embodying equalizer adaptation according to an embodiment of the invention. The input signal s is analog and is sampled and converted to digital by an analog-to-digital converter (ADC) 402. The ADC 402 should quantize to at least 3 bits to generate soft symbols for the input samples x. When input samples x are clipped, the input samples $x_{clip}$ can have the characteristic discussed earlier in connection with Equation 3. Clipping is detected by a non-linear threshold block 404, which can be firmware (embedded software) or hardware that determines when the input samples x corresponding to an equalized sample y are at the maximum positive or maximum negative output level of the ADC 402 or are otherwise clipped or heavily compressed, such as having reached a particular threshold for an analog amplifier. Heavy compression can occur with an input-output transfer characteristic of at least 1 decibel (dB) of compression in an operating range.

An adaptation block 405, which can be implemented in firmware/software or hardware or by a combination of both firmware and hardware, is programmed or configured not to rely on clipped samples of the input samples $x(k)$ for generating coefficients for an equalizer 406. The adaptation block 405 does not have to operate in real time. For example, the adaptation block 405 can generate coefficients for the linear equalizer based on stored data. When implemented in firmware, the adaptation block 405 can discard input samples x that are clipped from analysis. Otherwise, for non-clipped samples, the equalizer 406 is adapted to reduce the error signal e via, for example, minimum mean-squared-error (MMSE) techniques. The equalizer 406 has transfer function h.

An output of the equalizer 406 corresponds to equalized samples y which are then converted to hard symbols d by a slicer 408. The hard symbols d correspond to the output of the receiver and are also used to generate the error signal e and for timing recover TR 410. Various components illustrated in FIG. 4 can be implemented in software or firmware or by hardware. Typically, items that operate at high speed, such as the ADC 402, the equalizer 406, the slicer 408, the timing recovery 410 and the like are implemented in hardware, which adaptation logic can be implemented in firmware, which can comprise computer executable instructions stored on a tangible medium, such as a ROM.

Figure 5:
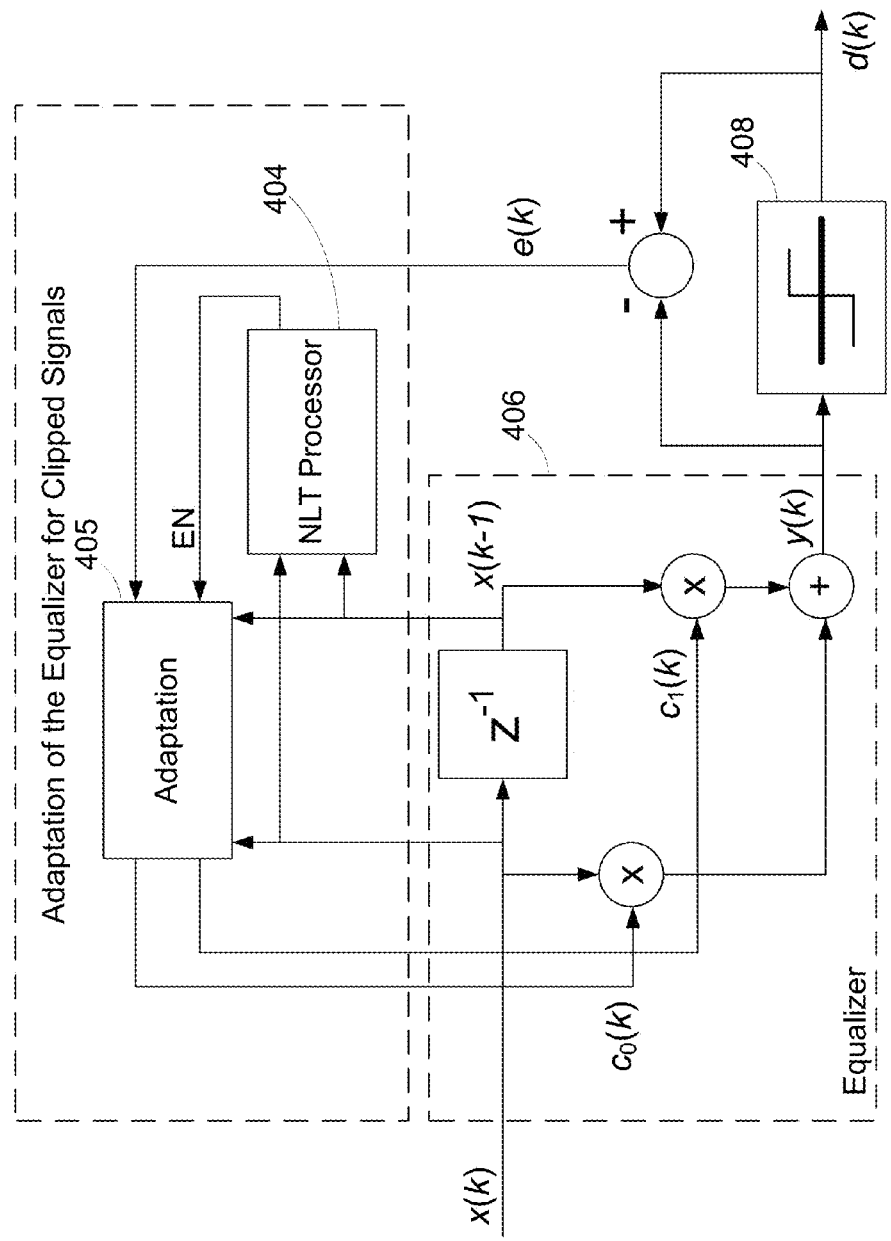
FIG. 5 illustrates an embodiment of the invention in which only input samples that are not clipped or not heavily compressed are used for adaptation of the equalizer, wherein equalization is not selectively applied or modified.

FIG. 5 illustrates an embodiment of the invention in which only input samples that are not clipped or not heavily compressed are used for adaptation of the equalizer, and wherein equalization is not selectively applied to the input samples x. The adaptation block 405 performs a variant of the LMS algorithm, while the non-linear threshold (NLT) processor 404 performs the detection of clipping and determines when adaptation is to be enabled.

One embodiment of the NLT processing block 404 uses states $NLT\_indicator_0$ and $NLT\_indicator_{-1}$, corresponding to the presence of clipping in the present samples $x(k)$ or in the previous samples $x(k-1)$, respectively, to enable or disable adaptation as described in Table 1.

TABLE 1

| NLT Processor of the Adaptation | | |
|---|---|---|
| $NLT\_indicator_{-1}$ | $NLT\_indicator_0$ | Adaptation Enable |
| 0 | 0 | ON |
| 0 | 1 | OFF |
| 1 | 0 | OFF |
| 1 | 1 | OFF |

In Table I, a '0' indicates no clipping, while a '1' indicates a clip or more generally, a sample $x(k)$ or $x(k-1)$ above the non-linear threshold (NLT). While illustrated in the context of a two tap equalizer (or normalized single tap equalizer), the principles and advantages of the disclosed techniques are extendable to equalizers with greater numbers of taps.

Figure 6:
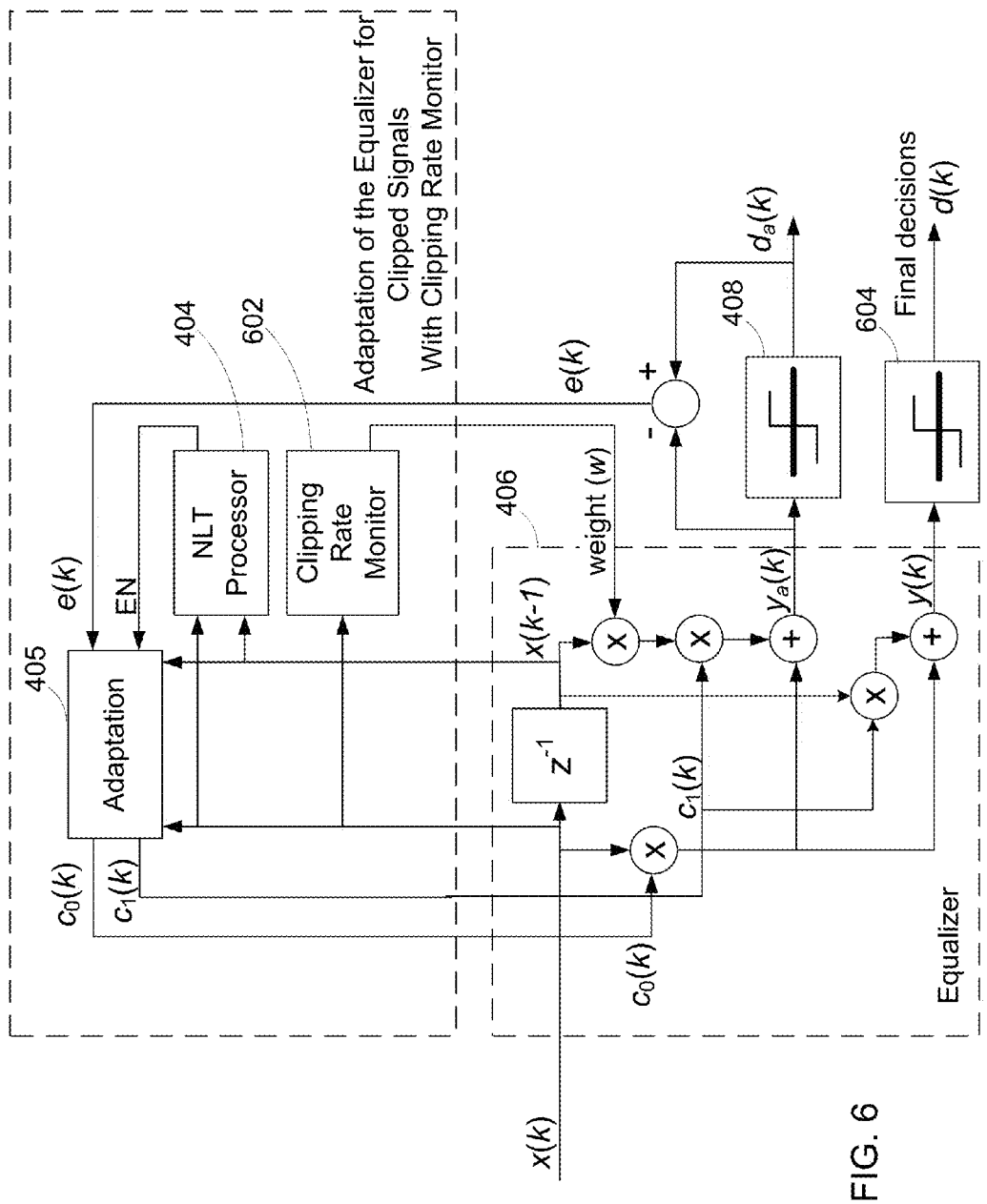
FIG. 6 illustrates an embodiment of the invention in which only input samples that are not clipped or not heavily compressed are used for adaptation of the equalizer, wherein the adaptation block further adjusts a coefficient value based on a clipping rate, and wherein the equalization is not selectively applied or modified.

FIG. 6 illustrates an embodiment of the invention in which only input samples that are not clipped or not heavily compressed are used for adaptation of the equalizer, wherein the adaptation logic further adjusts a coefficient value based on a clipping rate, and wherein equalization is not selectively applied to or modified for the input samples x.

As described earlier in connection with FIG. 3, in the presence of a relatively small amount of clipping, the adaptation block tends to generate coefficients that under equalize the equalized signal y even when adaptation is performed using only samples that were based on unclipped input samples x. As previously explained, this is due to correlations introduced into the input sequence by selection of unclipped data used for adaptation. FIG. 3 illustrates that tap values generated during clipping rates in the range of 0.2 to 0.45 under-equalizes the channel when compared to the non-clipped case. For one example from FIG. 3 (single-tap equalizer), a tap value for the clipping rate of 0.44 (44%) found by the adaptation logic is −0.31 instead of being −0.38 as was found for the no clip case. Hence the system performance can be improved if the tap is additionally weighted by 0.31/0.38=0.82 within the feedback loop during adaptation as explained in greater detail as follows.

In FIG. 6, a clipping rate monitor 602 corrects for the under equalization of the example of FIG. 3; however, in certain embodiments, over equalization can occur. The clipping rate monitor 602 detects when the clipping rate exceeds a particular level and applies a weighting of the form described to increase performance. The clipping rate monitor 602 can operate according to criteria other than the clipping rate exceeding a fixed threshold, such as criteria related to a clipping rate observed during adaptation. In one example, when the channel characteristics are known, the clipping rate monitor 602 can refer to data stored in a lookup table (LUT) to find an appropriate compensating value for a particular clipping rate.

The equalizer 406 illustrated in FIG. 6 generates two equalized symbols, $y_a(k)$, $y(k)$ for two corresponding slicers 408, 604. Equalized symbols $y_a(k)$ are sliced by slicer 408 to generate hard symbols $d_a(k)$, and the equalized symbols $y_a(k)$ and the hard symbols $d_a(k)$ are used for adaptation via the error signal e(k). Within the path of the adaptation feedback loop that includes the equalized symbols $y_a(k)$ and the slicer 408, a weight w from the clipping rate monitor 602 is applied to the second tap.

The weight w can be applied either to the coefficient $c_1(k)$ or to the previous samples x(k−1) as multiplication has an associative property. In addition, while illustrated as a multiplication within the equalizer in the embodiments of FIGS. 6, 7A, and 7B, the multiplication of, for example, one or more weights w (other weights to be described later) and a coefficient $c_0(k)$ can be performed in firmware on a relatively infrequent basis (updated only during adaptation) to minimize the multiplications performed in hardware by the equalizer, which can occur at the symbol rate. While the coefficients $c_0(k)$ and $c_1(k)$ are indexed with time k in the text and the drawings, the adaptation logic does not have to change the coefficients at the symbol rate or in real time.

In this example with under-equalization, by effectively decreasing the equalization applied at the second tap via the weight w, the adaptation logic 405 then generates a value for coefficient $c_1(k)$ that is higher than otherwise would be generated without the influence of the weight w, thereby effectively modifying the coefficient $c_1(k)$. While illustrated in the context of under-equalization, as illustrated in FIG. 3, it is possible for adaptation to correct over-equalization in the presence of clipping as well.

The equalized symbols y(k) are based on the effectively modified coefficient $c_1(k)$, which is then sliced by the slicer 604 to generate hard symbols d(k) representing the data output. An alternative to adding the weight w within the feedback loop will be described later in connection with FIG. 7B.

When the channel characteristics are not known, the tap weighting can be determined heuristically by adjusting the weight values between 0.8 and 1, based on a predetermined fixed offset or automatically through a clipping rate monitor 602 that is adaptive.

Figure 7A:
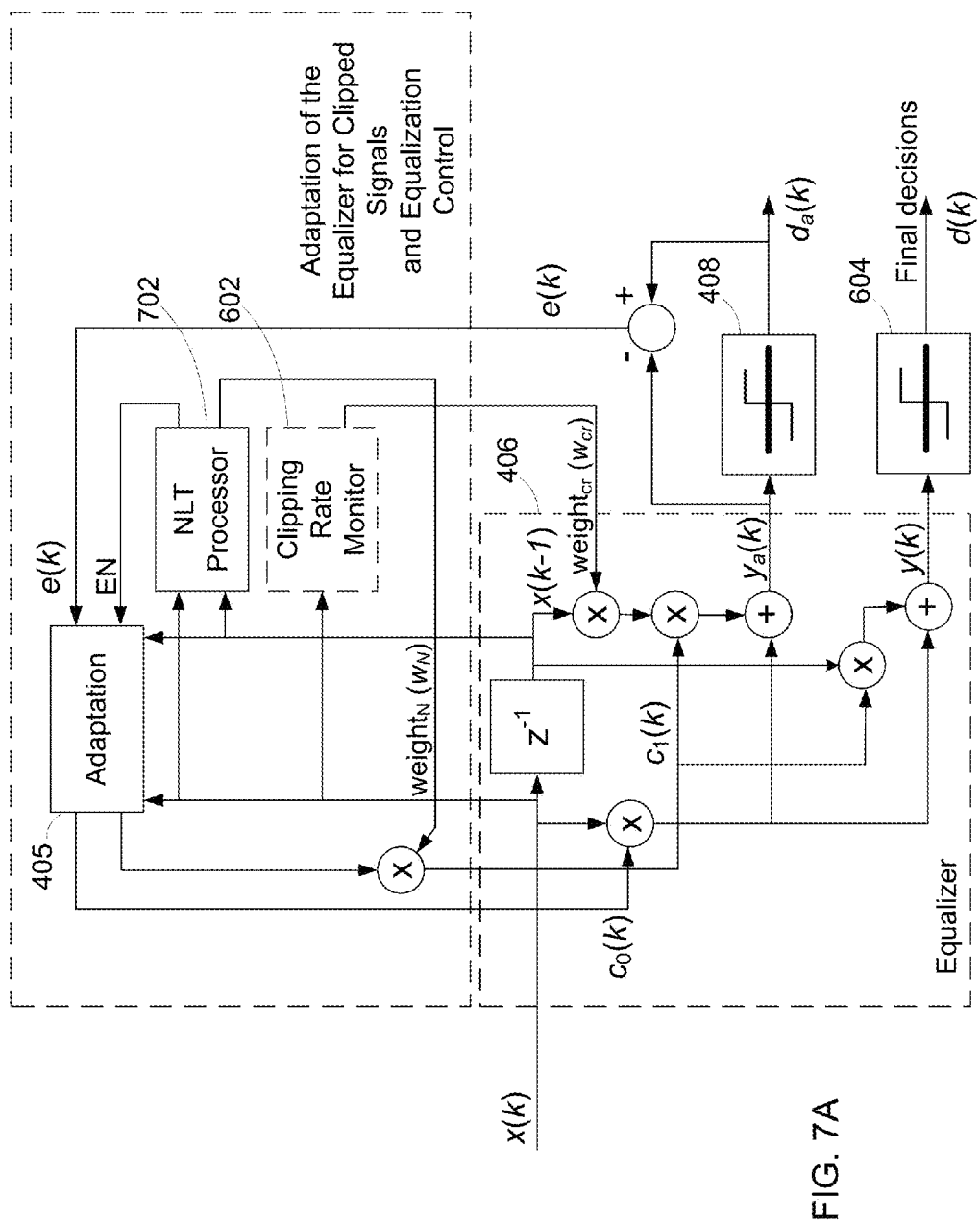
FIG. 7A illustrates an embodiment of the invention in which only input samples that are not clipped or not heavily compressed are used for adaptation of the equalizer, wherein equalization is selectively applied or modified.

FIG. 7A illustrates an embodiment of the invention in which only input samples that are not clipped or not heavily compressed are used for adaptation of the equalizer, wherein equalization is selectively applied to or modified for the input samples x. The clipping rate monitor 602 aspects discussed earlier in connection with FIG. 6 are optional.

An NLT processor 702 operates as described for the NLT processor 404 of FIGS. 4 and 5, but in addition, can modify one or more coefficients for the equalizer. FIG. 7A depicts the operation of modifying the coefficients c1(k) by multiplying the coefficient c1(k) with $weight_N$ ($w_N$) from the NLT processor 702. For example, the weight $w_N$ can correspond to 0, w1, or $w_2$ as described in U.S. patent application Ser. No. 12/359,046, which is incorporated by reference herein. Optionally, the coefficient generated by the adaptation block 405 or the previous samples x(k−1) can also be multiplied by a $weight_{cr}$ $w_{cr}$ from the optional clipping rate monitor 602 to generate the equalized soft symbol samples $y_a(k)$, hard symbols $d_a(k)$ (sliced by slicer 408), and error signal e(k) for adaptive generation of equalizer weights as discussed earlier in connection with FIG. 6. The equalized symbols y(k) is generated without modification by the optional clipping rate monitor 602, and sliced by a slicer 604 to generate hard symbols d(k), which are used as the final decisions of the receiver.

If it is desired to use $weight_N$ ($w_N$) from the NLT processor 702 without the optional clipping rate monitor, then the equalized samples $y_a(k)$ are not generated, the slicer 408 is not needed, and rather, the error signal e(k) is based on a difference between the hard symbols d(k) and the equalized soft symbols y(k).

Figure 7B:
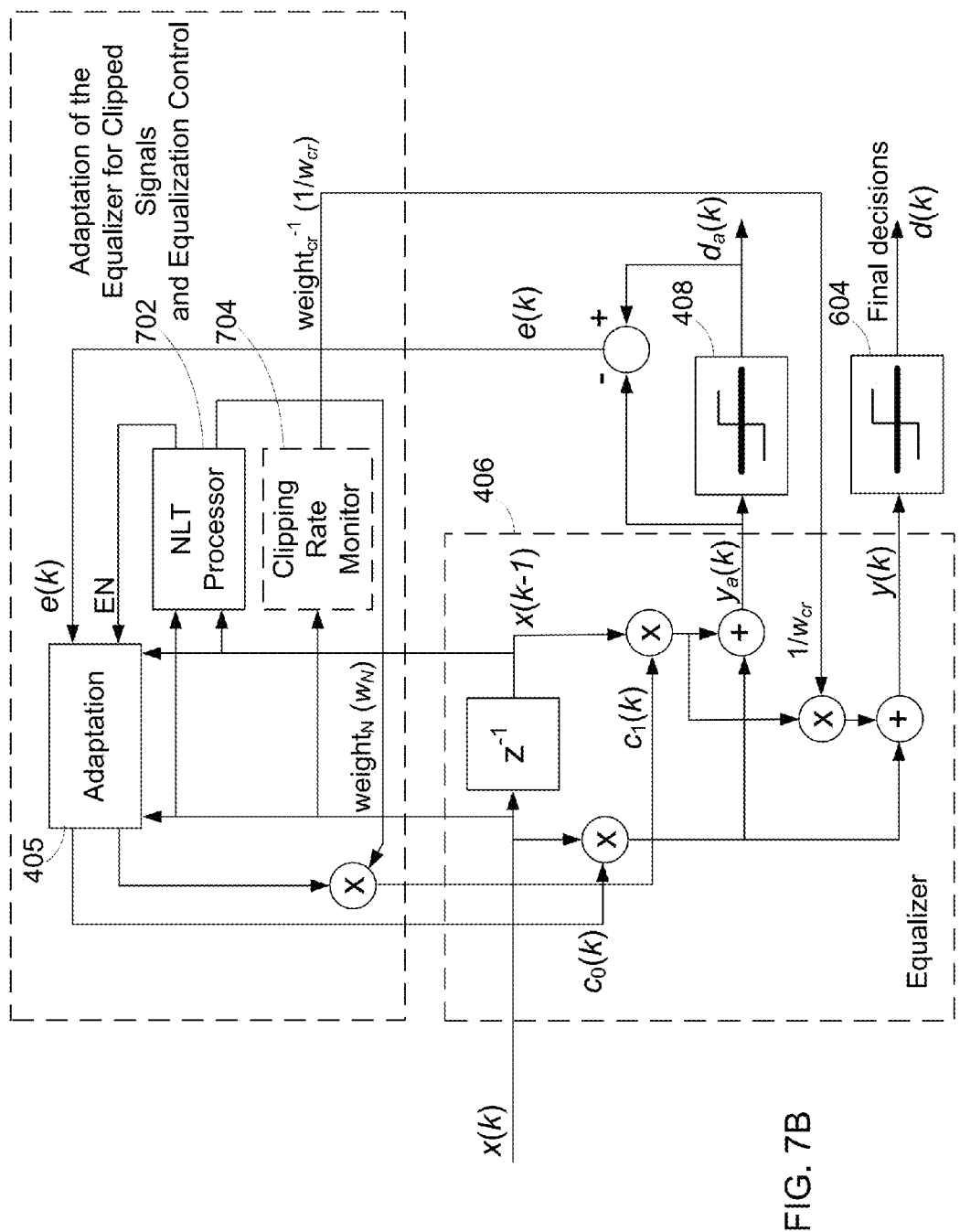
FIG. 7B illustrates an alternative embodiment of the invention in which only input samples that are not clipped or not heavily compressed are used for adaptation of the equalizer, wherein equalization is selectively applied or modified.

FIG. 7B illustrates an alternative embodiment for implementing modification of coefficients with the optional clipping rate monitor 602. The principles illustrated in FIG. 7B are also applicable to an alternative embodiment similar to FIG. 6, which does not combine the selective adaptation with selective or modified equalization application.

Returning to FIG. 7B, the $weight_{cr}^{-1}$ ($1/w_{cr}$) from the clipping rate monitor 704 is inverted with respect to the weight from the clipping rate monitor 602 (FIG. 6). Again, two equalized soft symbols streams $y_a(k)$, $y(k)$ are generated by the equalizer. The equalized soft symbols $y_a(k)$ are sliced into hard symbols $d_a(k)$, and used to generate an error signal e(k) for adaptation. The equalized soft symbols $y_a(k)$ for the embodiment of FIG. 7B are not generated based on weights from the clipping rate monitor 704. Rather, the $weight_{cr}^{-1}$ ($1/w_{cr}$) is applied to the coefficient $c_1(k)$, to the delayed data samples x(k−1), or to the product $c_1(k)x(k−1)$ to generate the equalized soft symbols y(k). A slicer 604 slices the equalized soft symbols y(k) to the data samples d(k), which are used for final decision outputs of the receiver.

In an alternative embodiment to the embodiments illustrated in FIGS. 6, 7A, and 7B, the equalized sample $y_a(k)$ is generated, but the slicer 408 is not used to generate a hard symbol sample $d_a(k)$. Rather, the hard symbol sample d(k) from slicer 604 is used with the equalized sample $y_a(k)$ to generate the error signal e(k) that is used for adaptation.

When the equalizer adaptation is performed as disclosed in the present application and the application of equalization to input samples x(k) equalizer application is selectively performed as described in copending U.S. patent application Ser. No. 12/359,046, the clipped equalizer performance is close to that of an equivalent linear MMSE receiver that operates in the same Gaussian environment without clipping. The results can be confirmed by determining the noise variance at the sampling instant in simulation, or by inspecting the data eye diagrams of the received signal and soft equalizer output sample y as discussed below.

FIGS. 8-11 are simulations of data eye diagrams for various conditions. In each of FIGS. 8-11, time in 10 s of picoseconds (ps) is expressed along a horizontal axis so that a time period from 0 to 300 ps is shown. Voltage is expressed along a vertical axis. The waveforms show unquantized signals, when in practice, the signals will be quantized by at least 3 bits. One benefit of embodiments of the invention is that due to the better performance offered, the number of bits used for quantization can be relatively low, such as 3-5 bits, which can lower cost over the use of a larger number of bits.

Figure 9:
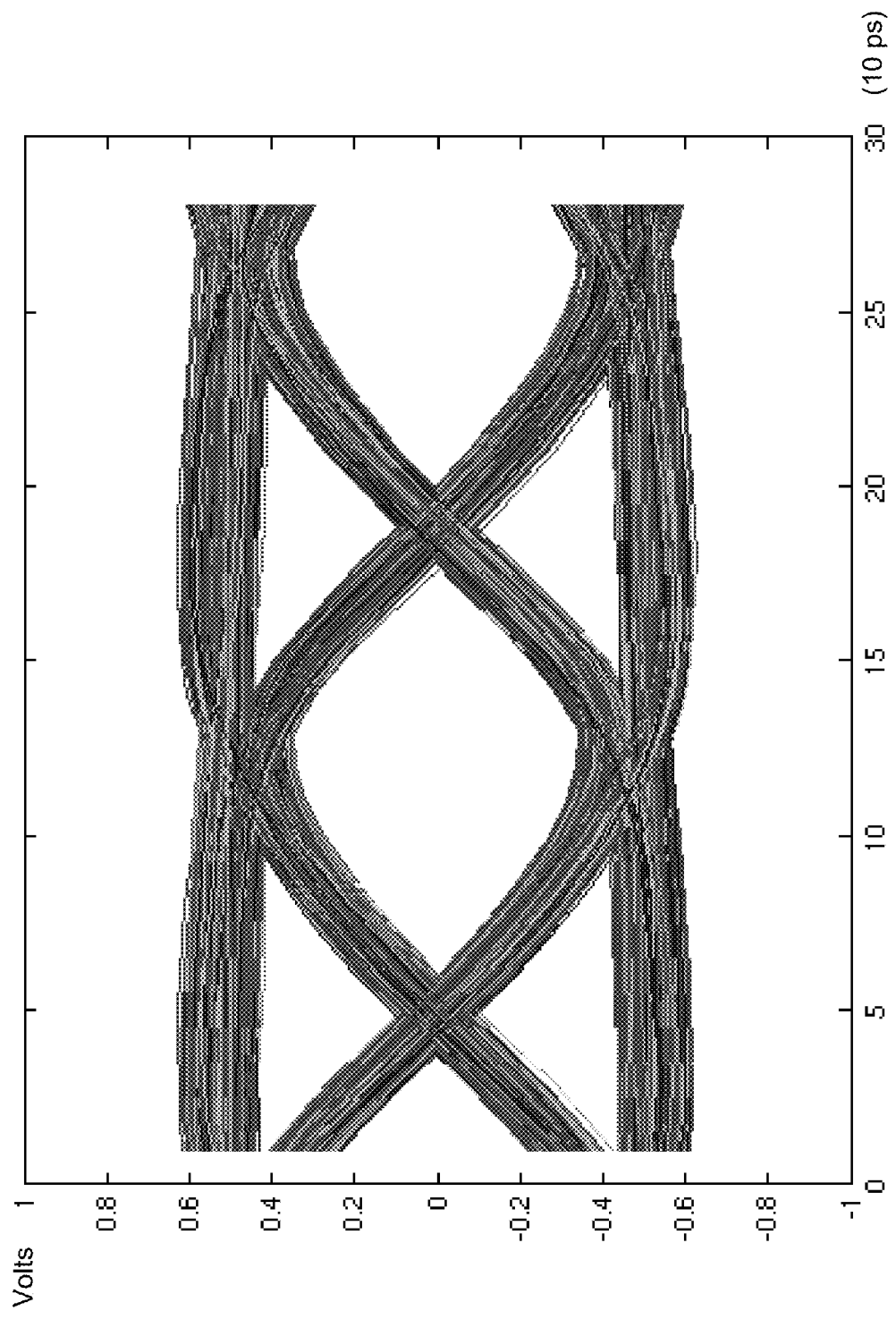

FIG. 8 is a simulation of a data eye diagram for input samples x(k) including inter-symbol-interference (ISI) due to the example channel impulse response described earlier in connection with FIG. 1. FIG. 9 is a simulation of a data eye diagram for equalized samples y(k) with the optimal filter coefficients of [1, −0.38]. There is no clipping in FIG. 8 or 9, and the examples of FIGS. 8 and 9 correspond to the ideal case. As illustrated by the improvement in the data eye of FIG. 5, conventional linear equalizer techniques are quite effective to reduce ISI under ideal conditions.

Figure 10:
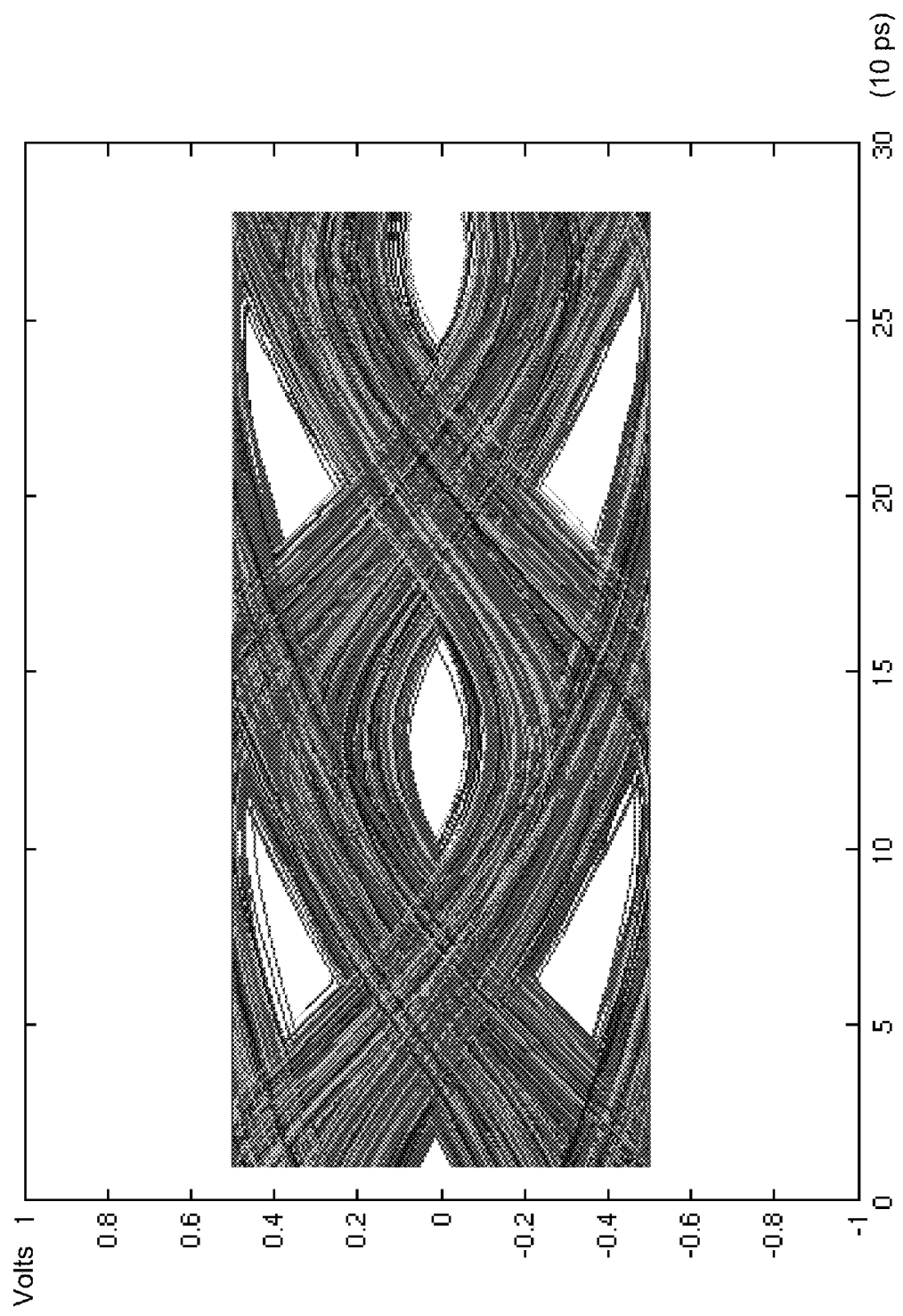

FIG. 10 is a simulation of a data eye diagram illustrating the clipping of the input samples x(k) at 500 mV without equalization. As indicated in the figure, the soft information beyond 500 mV is lost.

Figure 11:
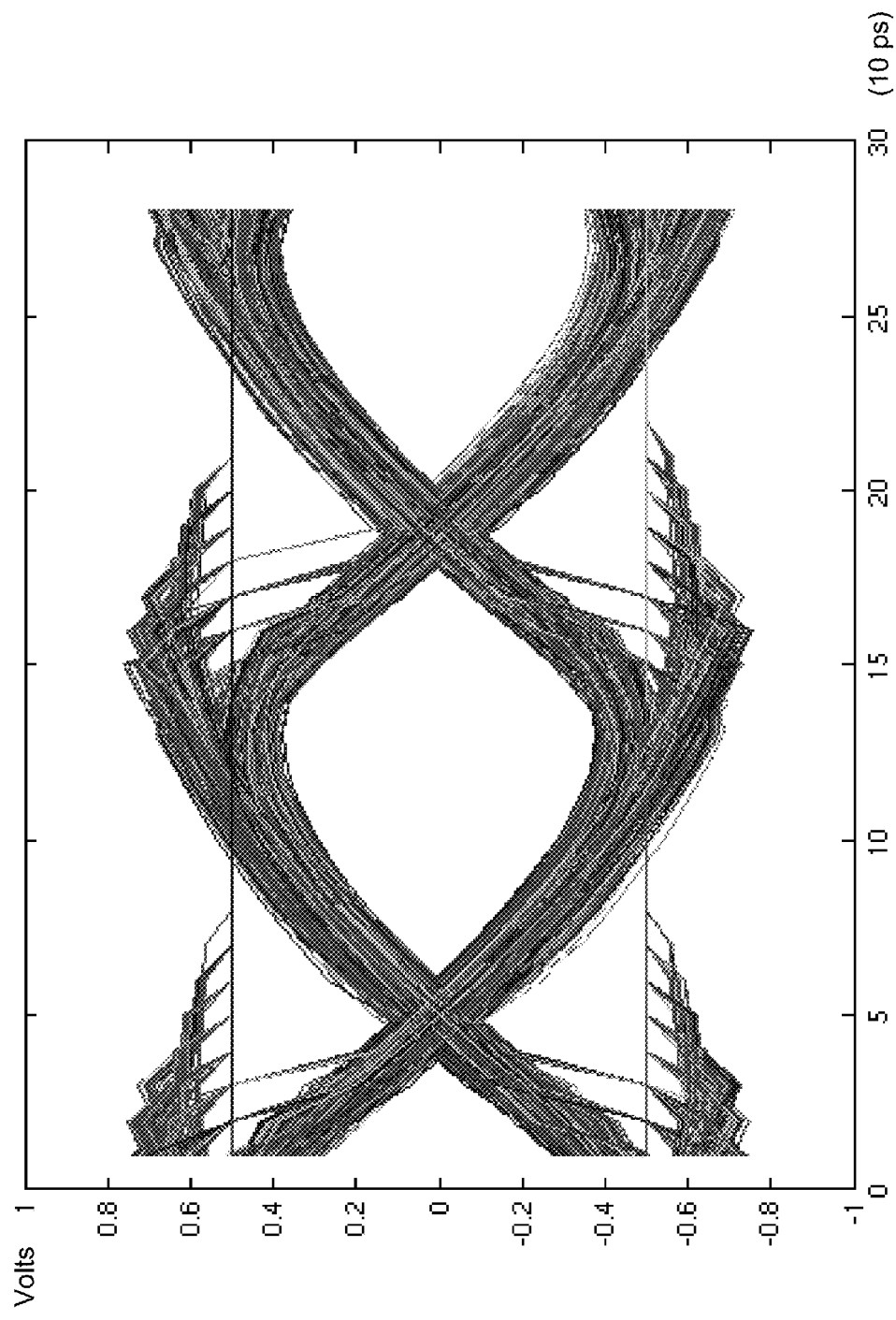

FIG. 11 is a simulation of a data eye diagram illustrating equalized samples y that are equalized by an embodiment of the invention in which (a) the equalized samples y used for equalization adaptation are selected so that adaptation is not based on equalized samples y that in turn are based on clipped or heavily compressed input samples x, and (b) equalization is selectively applied to the input samples x to generate the equalized samples y.

As illustrated FIG. 9 and FIG. 11, both of the data eye diagrams have data eyes that exhibit wide openings both vertically and horizontally. Note also that, as indicated by the data eye diagram of FIG. 11, the equalized samples y can have levels above the input clipping level depending on the combination of the input symbol samples x.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

As used herein, a "node" means any internal or external reference point, connection point, junction, signal line, conductive element, or the like at which a given signal, logic level, voltage, data pattern, current, or quantity is present. Furthermore, two or more nodes may be realized by one physical element (and two or more signals can be multiplexed, modulated, or otherwise distinguished even though received or provided as an output at a common node).

Various embodiments have been described above. Although described with reference to these specific embodiments, the descriptions are intended to be illustrative and are not intended to be limiting. Various modifications and applications may occur to those skilled in the art.

What is claimed is:

1. A method of determining equalizer coefficients, the method comprising:
   equalizing received symbols to generate equalized symbols, wherein an equalized symbol is based at least partly on one or more equalizer coefficients and two or more received symbols; and
   adaptively generating the one or more equalizer coefficients for equalization based at least indirectly on selected equalized symbols, wherein the selected equalized symbols are selected to exclude those equalized symbols based on at least one received symbol that is identified as clipped or heavily compressed.

2. The method of claim 1, wherein adaptively generating the one or more equalizer coefficients for equalization is based on a comparison between the selected equalized symbols and hard symbols sliced from the selected equalized symbols.

3. The method of claim 1, further comprising:
   receiving a communications signal having symbols embedded therein;
   converting the received communications signal from analog form to digital form to generate the received symbols, wherein the received symbols are quantized to at least 3 bits; and
   determining that the at least one received symbol is clipped or heavily compressed when the at least one received symbol is at a maximum positive value or a maximum negative value of an associated analog-to-digital conversion.

4. The method of claim 1, wherein equalizing further comprises selectively equalizing a current received symbol based at least partly on a determination of whether or not the current received symbol and/or the immediately prior received symbol to the current received symbol has been non-linearly distorted beyond a threshold, wherein the threshold indicates clipping and/or heavy compression.

5. The method of claim 4, further comprising determining that a clipping rate of the received symbols has exceeded a clipping rate threshold, and modifying the one or more equalizer coefficients based on the clipping rate.

6. The method of claim 1, further comprising determining that a clipping rate of the received symbols has exceeded at least a threshold, and modifying the one or more equalizer coefficients based on the clipping rate.

7. The method of claim 1, further comprising using at least a first equalization path and a second equalization path for equalization of the received symbols to first equalized symbols and second equalized symbols, respectively, wherein the equalization applied by the first equalization path and the second equalization path vary to compensate for a clipping rate, wherein the first equalization path is used for adaptation, and the second equalization path is used to generate output data.

8. A method of determining equalizer coefficients, the method comprising:
   equalizing received symbols to generate equalized symbols, wherein an equalized symbol is based at least partly on one or more equalizer coefficients and two or more received symbols; and
   adaptively generating the one or more equalizer coefficients for equalization based at least indirectly on selected equalized symbols, wherein the selected equalized symbols are selected to exclude those equalized symbols in which each of the received symbols used to generate the excluded equalized symbols is identified as clipped or heavily compressed.

9. An apparatus for determining equalizer coefficients for a receiver, the apparatus comprising:
   an equalizer configured to generate equalized symbols, wherein an equalized symbol is based at least partly on one or more equalizer coefficients and two or more received symbols; and means for adaptively generating the one or more equalizer coefficients for equalization based at least indirectly on selected equalized symbols, wherein the selected equalized symbols are selected to exclude those equalized symbols based on at least one received symbol that is identified as clipped or heavily compressed.

10. An apparatus for determining equalizer coefficients for a receiver, the apparatus comprising:
an equalizer configured to generate equalized symbols, wherein an equalized symbol is based at least partly on one or more equalizer coefficients and two or more received symbols; and
means for adaptively generating the one or more equalizer coefficients for equalization based at least indirectly on selected equalized symbols, wherein the selected equalized symbols are selected to exclude those equalized symbols in which each of the received symbols used to generate the excluded equalized symbols is identified as clipped or heavily compressed.

11. An apparatus for determining equalizer coefficients, the apparatus comprising:
an equalizer configured to generate equalized symbols, wherein an equalized symbol is based at least partly on one or more equalizer coefficients and two or more received symbols; and
an adaptation block configured to generate the one or more equalizer coefficients for equalization based at least indirectly on selected equalized symbols, wherein the selected equalized symbols are selected to exclude those equalized symbols based on at least one received symbol that is identified as clipped or heavily compressed.

12. The apparatus of claim 11, wherein the adaptation block is further configured to generate the one or more equalizer coefficients for equalization based on a comparison between the selected equalized symbols and hard symbols sliced from the selected equalized symbols.

13. The apparatus of claim 11, further comprising:
an analog-to-digital converter configured to convert an analog communications signal having symbols embedded therein to digital form to generate the received symbols, wherein the received symbols are quantized to at least 3 bits; and
wherein the adaptation block is further configured to determine that the at least one received symbol is clipped or heavily compressed when the at least one received symbol is at a maximum positive value or a maximum negative value of the analog-to-digital converter.

14. The apparatus of claim 11, wherein the equalizer is further configured to selectively equalize a current received symbol based at least partly on a determination of whether or not the current received symbol and/or the immediately prior received symbol to the current received symbol has been non-linearly distorted beyond a threshold, wherein the threshold indicates clipping and/or heavy compression.

15. The apparatus of claim 14, wherein the adaptation block is further configured to determine that a clipping rate of the received symbols has exceeded a clipping rate threshold, and to modify the one or more equalizer coefficients based on the clipping rate.

16. The apparatus of claim 11, wherein the adaptation block is further configured to determine that a clipping rate of the received symbols has exceeded at least a threshold, and to modify the one or more equalizer coefficients based on the clipping rate.

17. The apparatus of claim 11, wherein the equalizer comprises at least a first equalization path and a second equalization path for equalization, wherein the equalization applied by the first equalization path and the second equalization path vary to compensate for a clipping rate, wherein the first equalization path generates equalized samples for adaptation, and wherein the second equalization path generates equalized samples for output data.

18. An apparatus for determining equalizer coefficients, the apparatus comprising:
an equalizer configured to generate equalized symbols, wherein an equalized symbol is based at least partly on one or more equalizer coefficients and two or more received symbols;
a tangible non-transitory computer-readable medium embodying a computer program, the computer program comprising firmware instructions configured to adaptively generate the one or more equalizer coefficients for equalization based at least indirectly on selected equalized symbols, wherein the selected equalized symbols are selected to exclude those equalized symbols based on at least one received symbol that is identified as clipped or heavily compressed; and
a processor configured to execute the firmware instructions.

19. An apparatus for determining equalizer coefficients, the apparatus comprising:
an equalizer configured to generate equalized symbols, wherein an equalized symbol is based at least partly on one or more equalizer coefficients and two or more received symbols; and
an adaptation block configured to generate the one or more equalizer coefficients for equalization based at least indirectly on selected equalized symbols, wherein the selected equalized symbols are selected to exclude those equalized symbols in which each of the received symbols used to generate the excluded equalized symbols is identified as clipped or heavily compressed.

20. An apparatus for determining equalizer coefficients, the apparatus comprising:
an equalizer configured to generate equalized symbols, wherein an equalized symbol is based at least partly on one or more equalizer coefficients and two or more received symbols;
a tangible non-transitory computer-readable medium embodying a computer program, the computer program comprising firmware instructions configured to adaptively generate the one or more equalizer coefficients for equalization based at least indirectly on selected equalized symbols, wherein the selected equalized symbols are selected to exclude those equalized symbols in which each of the received symbols used to generate the excluded equalized symbols is identified as clipped or heavily compressed; and
a processor configured to execute the firmware instructions.

* * * * *